United States Patent [19]

Swartz

[11] Patent Number: 5,124,604
[45] Date of Patent: Jun. 23, 1992

[54] DISK DRIVE MOTOR

[75] Inventor: Jack S. Swartz, San Jose, Calif.

[73] Assignee: Areal Technology Corp., San Jose, Calif.

[21] Appl. No.: 609,106

[22] Filed: Nov. 5, 1990

Related U.S. Application Data

[63] Continuation of Ser. No. 366,615, Jun. 15, 1989, abandoned.

[51] Int. Cl.$^5$ ............ H02K 11/00; H02K 1/22; H02P 5/06; H02P 7/06
[52] U.S. Cl. .................. 310/68 B; 318/254; 310/268
[58] Field of Search ............ 310/67 R, 68 R, 68 B, 310/156, 181, 84, 198, 268, DIG. 6; 318/254; 324/207, 208

[56] References Cited

U.S. PATENT DOCUMENTS

| | | | |
|---|---|---|---|
| 3,569,753 | 3/1971 | Babikayan | 310/68 R |
| 3,906,267 | 5/1974 | Coupin et al. | 310/68 R |
| 4,336,475 | 6/1982 | Morinaga et al. | 310/184 |
| 4,455,513 | 6/1984 | Fulton et al. | 318/254 |
| 4,484,114 | 11/1984 | Ebbs | 318/254 |
| 4,531,079 | 7/1985 | Muller | 318/254 |
| 4,673,849 | 6/1987 | Sears et al. | 318/254 |
| 4,717,994 | 1/1988 | Diaz et al. | 363/56 |
| 4,779,165 | 10/1988 | Elsaesser et al. | 310/156 |
| 4,837,474 | 6/1989 | Petersen et al. | 310/268 |
| 4,902,923 | 2/1990 | Okauchi | 310/268 |

FOREIGN PATENT DOCUMENTS 100057  7/1980  Japan ................ 310/68 R

Primary Examiner—Steven L. Stephan
Assistant Examiner—C. LaBalle
Attorney, Agent, or Firm—N. Kallman

[57] ABSTRACT

An axial gap motor for use in a disk drive includes a rotatable magnet rotor and fixed first and second windings closely spaced from the rotor. The rotor and windings are disposed coaxially about a rotatable spindle to which the rotor is mounted. Current supplied to one winding actuates the rotor to rotate in a run mode. Current supplied to the other winding positions the rotor for maximum torque for starting the motor, and enables the sensing of the speed of the rotating rotor.

2 Claims, 2 Drawing Sheets

MAGNETIZATION DIRECTION

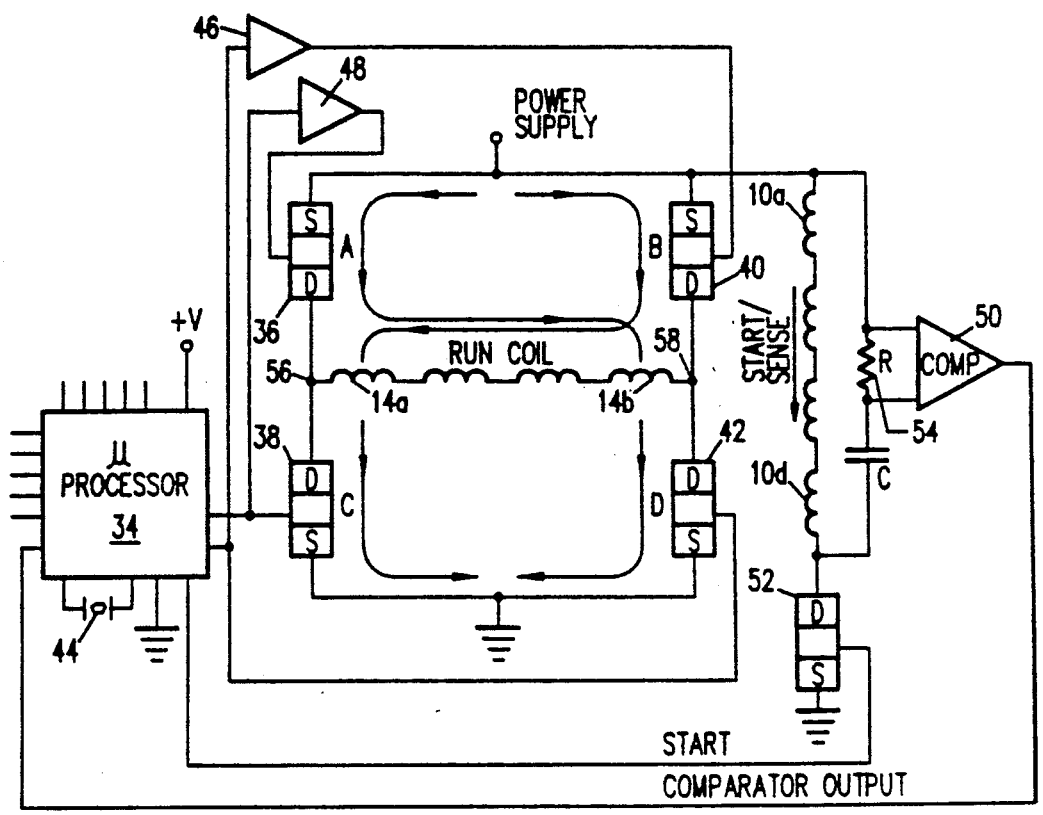
FIG. 4
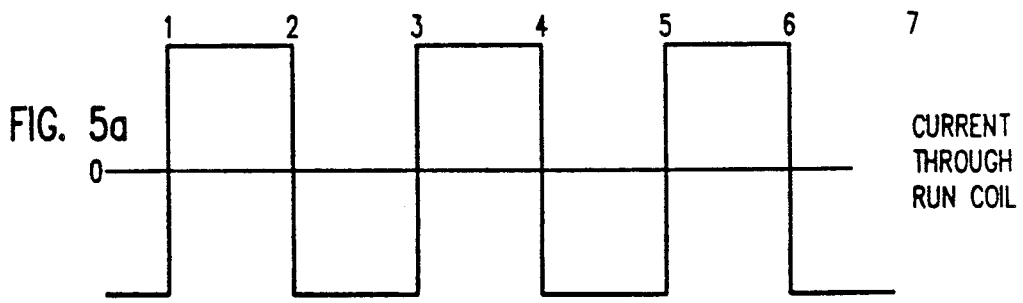
FIG. 5a — CURRENT THROUGH RUN COIL
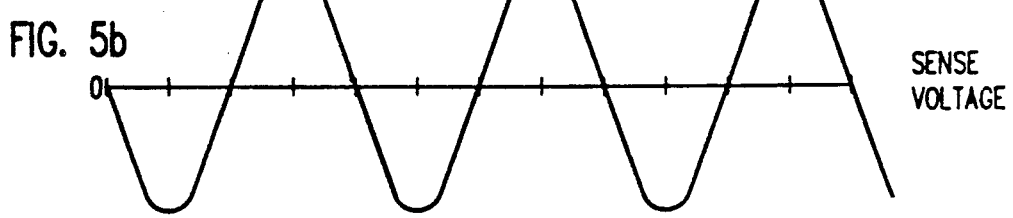
FIG. 5b — SENSE VOLTAGE
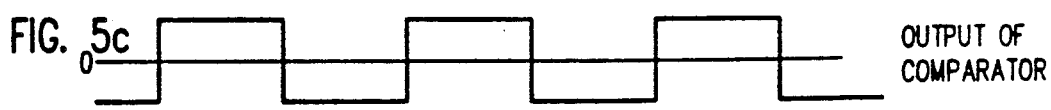
FIG. 5c — OUTPUT OF COMPARATOR

DISK DRIVE MOTOR

BACKGROUND OF THE INVENTION

1. Field of the Invention

This invention relates to a drive motor for rotating disks, rotation in a disk drive.

2. Description of the Prior Art

In prior art disk drives used for recording and storing data, one or more disks are generally mounted to a rotary spindle that is coupled to and rotated by a drive motor. The drive motor is directly mounted to the spindle or coupled through a pulley belt to the spindle. The prior art disk drives required motor structures that were relatively large, were expensive to manufacture and maintain, and used a significant amount of power during operation.

As the disk drive technology progressed, the size of the disk has been made smaller presently employing 5.25" and 3.50" diameter size disks, as compared to the previous 14" and 8" diameter disks, and disk drives have become more compact yet capable of processing more highly packed data. However the motor structures were still relatively bulky, expensive and did not afford optimum efficiency. Such motor structures also did not lend themselves easily to automation techniques. In addition, prior known disk drives generally required a sensing device, such as a Hall sensor, associated with the rotary spindle to provide the angular position of the rotating disk. In this way, it was possible to determine which sector of the disk tracks was being addressed for recording or readout.

SUMMARY OF THE INVENTION

An object of this invention is to provide an improved drive motor assembly useful for disk rotation in a disk drive.

Another object of this invention is to provide a compact, low weight rotary drive motor that is simple to construct and maintain.

Another object is to provide a drive motor that uses low power and is very efficient.

A further object is to provide a drive motor that uses a simplified electronics system for controlling motor performance.

According to this invention, a drive motor useful for disk rotation in a disk drive comprises an axial gap motor having two electrical windings or coil assemblies that coact with a permanent magnet rotor. The windings are disposed at 90 electrical degrees relative to each other and are fixed and stationary. One winding acts as a run winding to rotate the motor at a desired speed controlled by a microcomputer. The other winding serves as a start/sense winding to align the magnet rotor prior to the run mode, and to sense the rotational velocity and angular position of the rotor during the run mode. The microcomputer controls the timing and action of the start sequence, the motor commutation and motor speed.

BRIEF DESCRIPTION OF THE DRAWINGS

The invention will be described in greater detail with reference to the drawing in which:

FIG. 4 is a schematic circuit diagram showing the motor circuit for operating the axial gap motor of this invention;

FIGS. 5a–c are waveforms to aid in the explanation of the invention; and

DESCRIPTION OF THE PREFERRED EMBODIMENT

Figure 1:
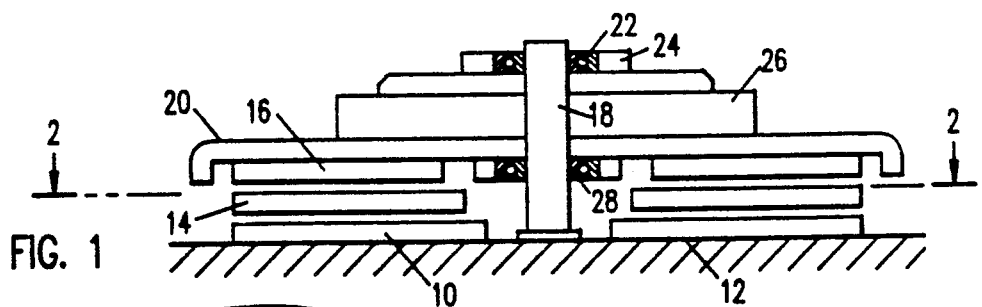
FIG. 1 is a sectional side view of an axial gap motor, made in accordance with this invention.

With reference to FIG. 1, an axial gap motor useful for disk rotation comprises a first coil winding assembly 10 that is positioned fixedly, by an insulating epoxy adhesive for example, on a base or support 12. An axial gap motor is characterized by the fact that the air gap dimension is measured parallel to the axis of the motor shaft, as compared to a radial dimension in the conventional motor assembly. An advantage of the axial air gap structure is the reduction in size and weight.

Figure 2:
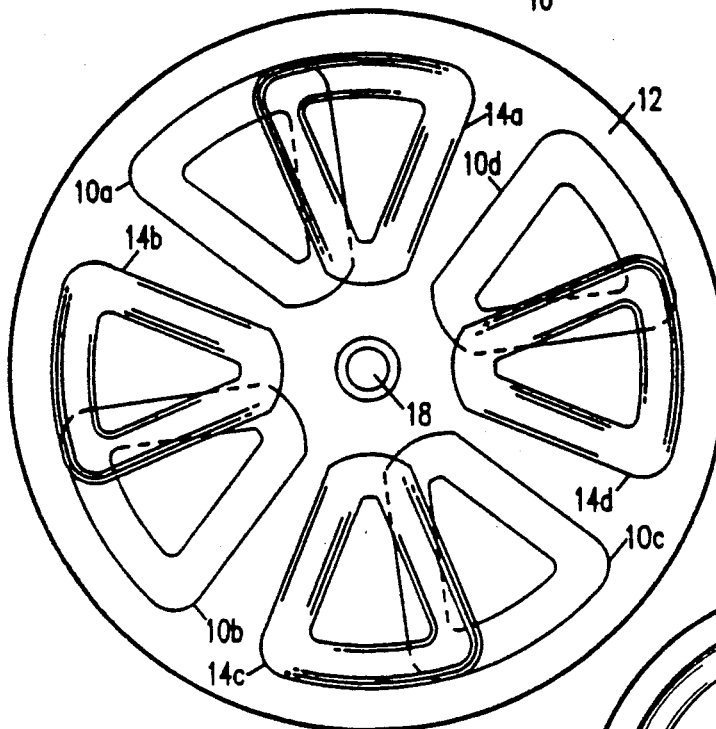
FIG. 2 is a top plan representation depicting the winding configuration of the axial gap motor.
Figure 3A:
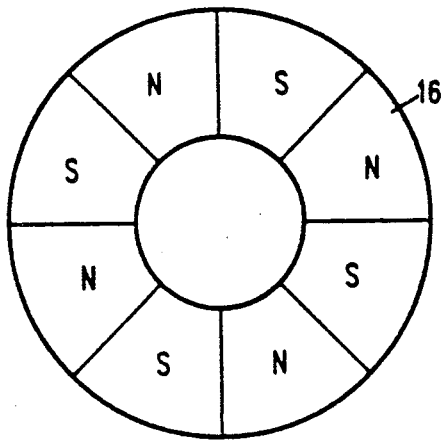
FIG. 3a is a representational view of the rotor magnet used with the invention.
Figure 3B:
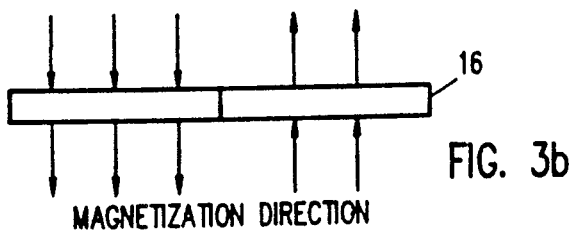
FIG. 3b illustrates the direction of the magnetic flux associated with the rotor magnet.

The winding assembly 10 of the motor described herein is formed in a four leaf clover configuration and is disposed in a planar arrangement, as shown in FIG. 2. The winding 10, which is designated as the start/sense coil, has four coil sections 10a,10b,10c,10d that are spaced at 90 electrical degree intervals. The coil sections 10a–d are serially connected and the two free ends of the winding 10 are electrically coupled to conductive pins for connection to an electrical circuit, such as illustrated in FIG. 4. A second coil winding 14, designated as the run coil, is formed in a similar four leaf clover configuration and is offset or physically positioned angularly about 45 degrees relative to the first winding so that a displacement of approximately 90 electrical degrees is realized. An insulating adhesive epoxy is used to hold the second winding in place in an insulating relation to the first winding. A rotor magnet 16 is mounted to a fixed shaft 18 located centrally relative to the windings. The magnet 16 is closely spaced from the windings 10 and 14 so that it may be electromagnetically coupled to the magnetic fields produced when current flows through the windings. As shown in FIG. 3a, he annular magnet rotor 16 has eight poles, four north and four south poles alternately, in this implementation. FIG. 3b depicts the magnetization pattern provided by the magnet 16. Other combinations and numbers of poles may be used for particular applications.

As illustrated in FIG. 1, the magnet 16 is joined to and retained within a steel cap 20 which has a flange or lip surrounding the magnet 16. Within the annulus of the magnet 16 and spaced therefrom is a centrally located first rotatable bearing 22 that is mounted to the shaft 18 and encompassed by a retainer element 24 within which the bearing 22 is free to rotate. On the top of the cap 20, which is the surface opposite to the one on which the rotor magnet 16 is seated, a plastic hub 26 and rotary spindle 27 are provided for rotation with a disk which is mounted to the hub 26 and clamped, as is well known in the art. The hub 26 is fixed to the top of the cap 20 by a suitable adhesive and is coaxially aligned with the shaft 18. A second rotatable bearing 28 is positioned within the hub and in alignment with the rotatable bearing 22. The hub 26 has a circular projection or annulus around which the magnetic disk is positioned. In this implementation, the disk is preferably of 3.5"

diameter. A clamp is used to hold the hub and the disk firmly in place by screws that engage threaded apertures formed in the hub. The cap 20 and the magnet rotor 16 are free to rotate with the bearings 22 and 28.

When current is applied to the coil assemblies 10 or 14, the applied current to the coils causes magnetic flux to be generated that interacts with the magnetic field of the rotor resulting in rotation of the rotor 16.

When initializing the axial gap motor for operation of the disk drive, it is desirable to align the rotor 16 in an angular position of maximum starting torque. The starting torque is equivalent to the turning effort or turning moment that a motor exerts at the instant of starting. Subsequently when the motor is put into the run mode, problems such as stiction and the need to overcome the mass of the motor are resolved.

To reach a position of maximum torque when the motor is initialized prior to the run mode, a microprocessor 34 under control of a program energizes a field effect transistor (FET) 52 (see FIG. 4). The FET 52 is coupled to one end of the winding 10 and between a power supply and a source of reference potential, which is ground in this implementation. The power supply provides a positive voltage, which may be +5 volts or +12 volts, according to the application. Upon energization of FET 52, a start current flows through start winding 10 thereby actuating the magnet rotor 16 to rotate. The start current signal from the microprocessor to the FET 52 is of a predetermined duration under control of the processor program. The rotor 16 turns part of a revolution so as to be aligned at the position of maximum torque prior to the time when the run winding 14 becomes energized. A crystal oscillator 44 is used for providing a time reference to the microcomputer. A short period of time is allowed to pass to ensure complete damping of the movement of the rotor.

During the initialization phase and alignment of the magnet, no current was supplied to the run winding 14 and the winding 14 was not energized. After initialization, the microprocessor 34 directs a signal to the FETs 36,38,40,42. The run coil 14 is connected at one end to a junction 56 between FETs 36 and 38 and at its other end to a junction 58 between FETs 40 and 42. Level translators 46 and 48 are coupled between the microprocessor and the FETs 36,38,40 and 42 to provide level translation if a different voltage supply than +5 volts, such as +12 volts, is used.

With the application of the signal from the microprocessor, current is passed through the run coil(see FIG. 5a) in a direction that causes the rotor to rotate in the desired angular direction. In one direction, current flows from the power source through FET 36, run coil 14, FET 42 to ground. In the other direction, current flows from the power supply through FET 40, run coil 14, FET 38 to ground. To account for the mass of the magnet rotor, the initial current flow to the run winding 14 is applied for a programmed period of time, 3-4 seconds for example, to reach a predetermined angular velocity of the motor. During this period, the disk velocity is slowly increasing, and the phase and amplitude of the signal sensed by the winding 10 and provided from a comparator 50 to the microprocessor 34 indicates that the disk has not as yet reached full operating speed. The frequency and amplitude of the signal during the period when the disk rotational speed is increasing are lower than when the disk is at full operating speed. At the end of the 3-4 second period, when the disk has attained the desired rotational speed, the disk drive is ready for head positioning, record, read and data handling operations. FIG. 5b illustrates the sense voltage and phase that represent the condition of full operational speed of the disk.

When the desired angular velocity for disk operation is attained and the disk is rotating at the desired operating speed, the microprocessor receives the signal (FIG. 5b) from the sense winding 10 in order to measure the phase contained in the voltage waveform induced by the rotating magnet motor in the run mode. An RC differentiator 54 comprising resistor R and capacitor C differentiates the induced voltage and the differentiated signal is compared in the comparator 50 to a reference voltage. The output (FIG. 5c) from comparator 50 is fed back to the microprocessor 34 and used to control the current (FIG. 5a) to the run winding and thus the speed of the rotating rotor.

The microprocessor controls the speed of the motor by controlling the magnitude of drive current supplied to the run winding 14. The drive current magnitude is determined by varying the pulse width of the drive signal supplied by the microprocessor 34 to the FETs 36,38,40,42 in response to the output signal from the comparator 50 which is fed back to the microprocessor. The FETs used in the circuit of this invention are driven directly from the microprocessor and thus afford high efficiency operation. In this implementation, the FETs are operated in a saturation mode to reduce power losses. The bipolar drive system is highly efficient and operates at relatively low power levels.

Figure 6:
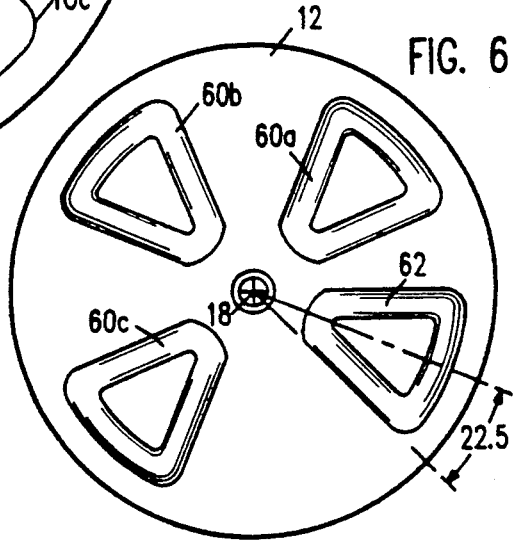
FIG. 6 is a top plan representation of an alternative embodiment depicting another winding configuration.

FIG. 6 is a representation of an alternative configuration of coils used with the axial gap motor of this invention. Whereas the implementation of FIGS. 1 and 2 includes four start/sense coils 10 located in one plane and four run coils 14 disposed in a second plane over the start/sense coils, the embodiment of FIG. 6 uses three run coils 60a,60b,60c disposed in three adjacent quadrants and a single start(pull-in)/sense coil 62 in the fourth quadrant. The coil 62 is offset about 22.5 degrees from the center of its quadrant, as illustrated. The four coils are located in a single plane thereby reducing the height and space required for the motor. By using less coils in the winding assemblies, it is apparent that coil winding complexity may be reduced and motor assembly is simplified and less expensive.

It should be understood that different combinations having an n number of run coils and an m number of start/sense coils, where n and m are at least one, can be used for accomplishing the functions described. The number of coils used is dependent upon the number of pole pieces used, which number can also be varied. With the 8 pole magnet shown in FIG. 3a, various combinations of 1,2 or 3 run coils with 3,2 or 1 start/sense coils can be employed.

In an implementation of the invention for use with a 3.5" disk, the disk drive was operated with a motor current of 4-6 milliamperes at +12 volts. When the magnetic heads are not loaded to the disk, the power level is in the range of 48-72 milliwatts. With the heads flying over the disk, the power input is slightly higher.

The motor assembly of this invention precludes the need for Hall sensors for commutation of the motor, thus simplifying the motor assembly and reducing the number of electrical connections. No metal is used in the return path of the run windings so that power losses which would occur due to hysteresis losses are reduced. The start/sense winding and run winding provide shared functions and the electronic circuit is relatively simple and inexpensive to make and maintain. The motor assembly can easily be manufactured with automation techniques. Also, the simplified motor structure is readily applicable for use with a head actuator system and allows the use of common parts for disk rotation and head accessing motion. By using the microprocessor control, the start sequence, motor commutation, motor speed and direct drive to the FETs are all easily implemented. The same microprocessor runs the motor, controls the servo and controller, and monitors the safety circuits, inter alia.

There has been described herein an axial gap motor of simple, compact and lightweight construction which uses low power for providing controlled rotational movement of a disk. The motor circuit enables control of motor speed and direction with minimal and inexpensive parts.

What is claimed is:

1. An axial gap motor for a disk drive for rotating one or more disks comprising:
  a magnet rotor formed with alternating north and south pole sections to provide a magnetic field;
  a stationary shaft to which said magnet rotor is mounted;
  a first electrical winding for receiving a current signal and for providing magnetic flux to interact with the magnetic field of said magnet rotor so that said magnet rotor is actuated to rotate unidirectionally in the run mode, said first winding comprising a plurality of coils all being serially connected; and
  means including a second electrical winding for aligning the position of said magnet rotor in a start mode prior to commutating said motor in the run mode, said second winding comprising a plurality of coils being serially connected, wherein said second winding is fixed in a first plane, and said magnet rotor is located in a second plane closely spaced from said second winding, wherein said first and second windings are disposed in the same plane, said first winding comprising three coils located in three adjacent quadrants, and said second winding comprising a fourth coil located in the fourth quadrant, said fourth coil being offset from the center of said fourth quadrant by 22.5 degrees approximately.

2. An axial gap motor for a disk drive for rotating one or more disks comprising:
  a magnet rotor formed with alternating north and south pole sections to provide a magnetic field;
  a stationary shaft to which said magnet rotor is mounted;
  a first signal electrical winding for receiving a current signal and for providing magnetic flux to interact with the magnetic field of said magnet rotor so that said magnet motor is actuated to rotate unidirectionally in the run mode;
  means including a second signal electrical winding for aligning the position of said magnet rotor in a start mode prior to commutating said motor in the run mode;
  wherein said first and second windings are fixed in a first plane, and said magnet rotor is located in a second plane in juxtaposition and closed spaced from said first plane without any other element disposed between said first and second planes, said first and second planes being parallel;
  said first winding comprising three coils located in three adjacent quadrants of said first plane, and said second winding comprising a fourth coil located in the fourth quadrant of said first plane, said fourth coil being offset from the center of said fourth quadrant.

* * * * *